United States Patent
Zheng et al.

(10) Patent No.: US 9,620,163 B1
(45) Date of Patent: Apr. 11, 2017

(54) MEASURING TRANSITION SHIFTS DUE TO LASER POWER VARIATION IN A HEAT-ASSISTED MAGNETIC RECORDING DEVICE

(71) Applicant: Seagate Technology LLC, Cupertino, CA (US)

(72) Inventors: Xuan Zheng, Savage, MN (US); Walter R. Eppler, Cranberry Township, PA (US); Julius K. Hohlfeld, Eden Prairie, MN (US); Heidi M. Olson, Burnsville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/155,985

(22) Filed: May 16, 2016

(51) Int. Cl.
| G11B 5/02 | (2006.01) |
| G11B 27/36 | (2006.01) |
| G11B 5/09 | (2006.01) |
| G11B 7/1267 | (2012.01) |
| G11B 5/00 | (2006.01) |

(52) U.S. Cl.
CPC .... *G11B 7/1267* (2013.01); *G11B 2005/0021* (2013.01)

(58) Field of Classification Search
CPC ..... G11B 5/012; G11B 27/36; G11B 2220/20; G11B 5/09; G11B 2220/90; G11B 20/1419; G11B 20/18; G11B 20/1426
USPC ........ 360/25, 31, 39, 40, 42, 44, 50, 53, 59; 375/360, 342, 371
See application file for complete search history.

(56) References Cited

U.S. PATENT DOCUMENTS

| 6,027,824 | A | 2/2000 | Suwabe et al. |
| 6,636,460 | B2 | 10/2003 | Akiyama et al. |
| 7,515,372 | B2 | 4/2009 | Erden et al. |
| 7,924,518 | B2 | 4/2011 | Mathew et al. |
| 7,969,678 | B2 | 6/2011 | Tanabe et al. |
| 8,315,128 | B1 | 11/2012 | Wilson et al. |
| 9,240,205 | B1* | 1/2016 | Gao .................. G11B 7/1263 |
| 2006/0233287 | A1 | 10/2006 | Yang et al. |

* cited by examiner

*Primary Examiner* — Nabil Hindi
(74) *Attorney, Agent, or Firm* — Hollingsworth Davis, LLC

(57) ABSTRACT

A method comprises writing a waveform on a magnetic recording medium using a heat-assisted magnetic recording apparatus which includes a laser. The method also comprises reading back the waveform from the medium, and detecting one or more transition shifts in the readback waveform indicative of a mode hop of the laser. The method further comprises measuring a metric of the one or more transition shifts.

22 Claims, 12 Drawing Sheets

MEASURING TRANSITION SHIFTS DUE TO LASER POWER VARIATION IN A HEAT-ASSISTED MAGNETIC RECORDING DEVICE

SUMMARY

Embodiments are directed to a method comprising writing a waveform on a magnetic recording medium using a heat-assisted magnetic recording (HAMR) apparatus which includes a laser. The method also comprises reading back the waveform from the medium, and detecting one or more transition shifts in the readback waveform indicative of a mode hop of the laser. The method further comprises measuring a metric of the one or more transition shifts.

Other embodiments are directed to an apparatus comprising a recording head configured for heat-assisted magnetic recording which includes a laser. A controller arrangement is coupled to the recording head and configured to write a waveform on a magnetic recording medium using the recording head, and read back the waveform from the medium using the recording head. The controller arrangement is also configured to detect one or more transition shifts in the readback waveform indicative of a mode hop of the laser, and measure a metric of the one or more transition shifts.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to paramagnetic effects that can lead to data errors.

In general, HAMR uses laser to heat magnetic media near or above the Curie temperature during recording. Stability of the laser power is important for recording performance since write width, magnetic transition location, and effective write field gradient highly depends on laser power. However, laser power stability is very challenging for HAMR due to various factors, including space limitations, high power density, strong optical feedback, and large environmental temperature variations.

Conventional methods of measuring laser power variation are not accurate, not directly related to recording performance, and difficult to provide specification. For example, methods that use bit error rate (BER) loss at high duty cycle recording assume that laser power variation at low duty cycle is smaller than at high duty cycle; this assumption is not always true. Methods that use an internal photodiode assume laser power at the front facet of the laser correlates with that at the back facet; this correlation varies with head design. A method that uses track average amplitude (TAA) variation can be impacted by media variation, and is difficult to provide specification.

Embodiments of the disclosure are directed to methods of quantitatively measuring the level of laser power variation. Embodiments of the disclosure are directed to measuring change in the phase of a recorded magnetic waveform to quantify the transition location shift created by laser power variation. For example, various embodiments involve writing a magnetic waveform to a magnetic recording medium, reading back the magnetic waveform, calculating a variation in the phase of the magnetic waveform, and converting the phase change to transition shifts to assess laser instability levels. Various outputs can be provided, including the total number of the transition shifts and the mean and maximum (in nanometers) of the transition shifts. Embodiments can be implemented in both test equipment (e.g., spin stand) and in-situ HAMR drives to screen heads/drives, provide design feedback, and improve (e.g., optimize) drive operation.

Figure 1:
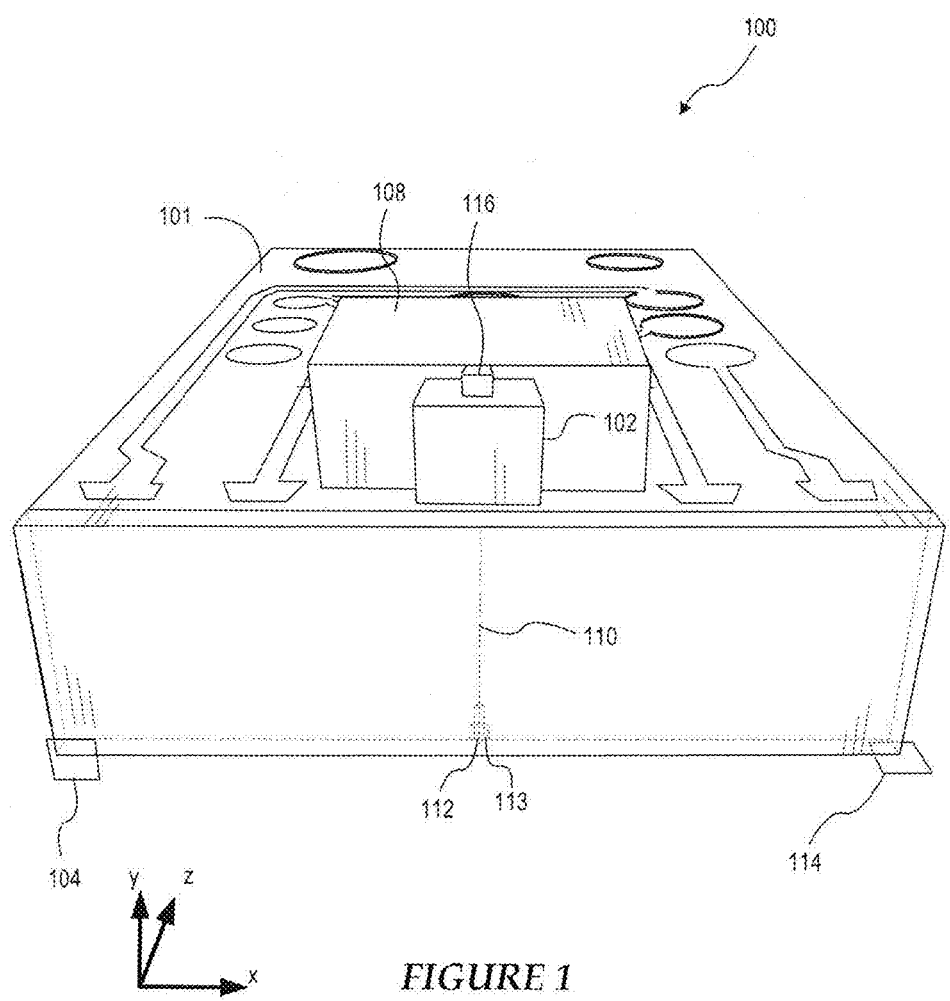
FIG. 1 is a perspective view of a HAMR slider with which various embodiments disclosed herein may be implemented.
Figure 2:
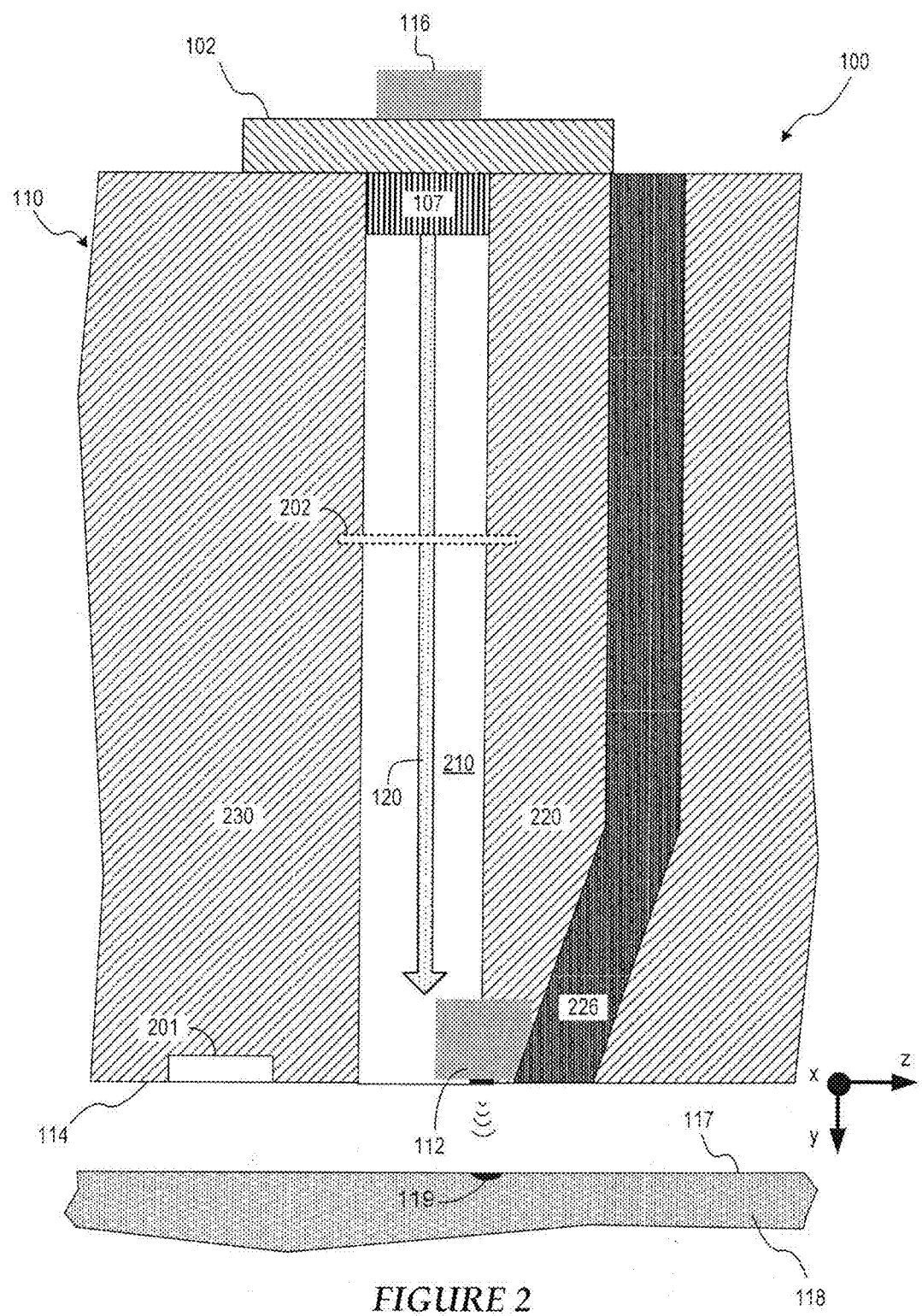
FIG. 2 is a cross-sectional view of a HAMR slider with which various embodiments disclosed herein may be implemented.

Embodiments of a HAMR head 100 are illustrated in FIGS. 1 and 2. As shown, the head 100 (also referred to as a slider) includes a light source (e.g., a laser diode) 102 located proximate a trailing edge surface 104 of the slider body 101. An optical wave (e.g., a laser beam) 120 generated by the light source 102 is delivered to an NFT 112 via an optical waveguide 110. The NFT 112 is aligned with a plane of an air bearing surface (ABS) 114 of the head 100, and one edge of a read/write head 113 is on the ABS 114. The read/write head 113 includes at least one writer and at least one reader. In some embodiments, multiple writers (e.g., 2 writers) and multiple readers (e.g., 3 readers) can be incorporated into the read/write head 113. The ABS 114 faces, and is held proximate to, a surface 117 of a magnetic medium 118 during device operation. The ABS 114 is also referred to as a media-facing surface.

The light source 102 in this representative example may be an integral, edge firing device, although it will be appreciated that any source of electromagnetic energy may be used. For example, a surface emitting laser (SEL), instead of an edge firing laser, may be used as the source 102. A light source may also be mounted alternatively to other surfaces of the head 100, such as the trailing edge surface 104. While the representative embodiments of FIGS. 1 and 2 show the waveguide 110 integrated with the head 100, any type of light delivery configuration may be used.

As shown in FIG. 1, the laser diode 102 is shown coupled to the slider body 101 via a submount 108. The submount 108 can be used to orient and affix an edge-emitting laser diode 102 so that its output is directed downwards (negative y-direction in the figure). An input surface of the slider body 101 may include a grating, and optical coupler or other coupling features to receive light from the laser diode 102. The head 100 also includes an optical energy measurement sensor, such as photodetector 116 (e.g., a photodiode), situated proximate the light source 102. The photodetector 116 is configured to measure of intensity the laser light output.

When writing with a HAMR device, electromagnetic energy is concentrated onto a small hotspot 119 over the track of the magnetic medium 118 where writing takes place, as is shown in the embodiment of FIG. 2. The light from the light source 102 propagates to the NFT 112, e.g., either directly from the light source 102 or through a mode converter or by way of a focusing element. FIG. 2, for example, shows an optical coupler 107 adjacent the light source 102, which is configured to couple light produced from the light source 102 to the waveguide 110.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 119 is on the order of 50 nm or less. Thus, the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device configured to generate local surface plasmon resonance at a designated (e.g., design) wavelength. The NFT 112 is generally formed from a thin film of plasmonic material on a substrate. In a HAMR head 100, the NFT 112 is positioned proximate the write pole 226 of the read/write head 113. The NFT 112 is aligned with the plane of the ABS 114 parallel to the surface 116 of the magnetic medium 118. The waveguide 110 and optional mode converter and/or other optical element directs electromagnetic energy 120 (e.g., laser light) onto the NFT 112. The NFT 112 achieves surface plasmon resonance in response to the incident electromagnetic energy 120. The plasmons generated by this resonance are emitted from the NFT 112 towards the magnetic medium 118 where they are absorbed to create a hotspot 119. At resonance, a high electric field surrounds the NFT 112 due to the collective oscillations of electrons at the metal surface (e.g., substrate) of the magnetic medium 118. At least a portion of the electric field surrounding the NFT 112 gets absorbed by the magnetic medium 118, thereby raising the temperature of a spot 119 on the medium 118 as data is being recorded.

FIG. 2 shows a detailed partial cross-sectional view of an embodiment of the HAMR head 100 in accordance with various embodiments. The waveguide 110 includes a layer of core material 210 surrounded by first and second cladding layers 220 and 230. The first cladding layer 220 is shown proximate the NFT 112 and the write pole 226. The second cladding layer 230 is spaced away from the first cladding layer 220 and separated therefrom by the waveguide core 210. The core layer 210 and cladding layers 220 and 230 may be fabricated from dielectric materials, such as optical grade amorphous material with low thermal conductivities. The first and second cladding layers 220 and 230 may each be made of the same or a different material. The materials are selected so that the refractive index of the core layer 210 is higher than refractive indices of the cladding layers 220 and 230. This arrangement of materials facilitates efficient propagation of light through the waveguide core 210. Optical focusing elements (not shown) such as mirrors, lenses, etc., may be utilized to concentrate light onto the NFT 112. These and other components may be built on a common substrate using wafer manufacturing techniques known in the art. The waveguide 110 may be configured as a planar waveguide or channel waveguide.

According to some embodiments, the head 100 includes one or more contact sensors, such as the contact sensor 201 shown in FIG. 2. The contact sensor 201 can be configured to sense for one or more of head-medium contact, thermal asperities, and voids of a magnetic recording medium. The contact sensor 201 can be implemented as a thermal sensor, such as a resistive temperature sensor (e.g., TCR sensor). For example, the contact sensor 201 can be implemented as a DETCR (Differential Ended Thermal Coefficient of Resistance sensor). The contact sensor 201 can be implemented using other technologies, such as a thermocouple or a thermistor. The contact sensor 201 is situated at or near the ABS 114 and proximate the NFT 112. As such, the contact sensor 201 can serve as a temperature sensor for the NFT 112 (e.g., laser output power monitor), in addition to serving as a head-medium/asperity contact sensor.

According to some embodiments, the head 100 shown in FIG. 2 can incorporate a bolometer 202 situated in the vicinity of the light path (e.g., the waveguide 110) and proximal of the NFT 112 in accordance with various embodiments. According to some embodiments, the bolometer 202 comprises an optical-to-thermal transducer configured to respond to fluctuations in output optical power of the laser 102. In some embodiments, the bolometer 202 comprises a thin metallic wire placed across the light path (e.g., the waveguide 110) within the internal body of the slider 100 at a location between the coupler 107 and the NFT 112. A small fraction of the output optical power of the laser 102 transmitted via the light path is absorbed by the wire and converted into thermal power, thereby increasing wire temperature. Fluctuations in output optical power of the laser 102 correlate to fluctuations in thermal power and temperature of the bolometer 202. These fluctuations in temperature can be detected by circuitry configured to monitor the resistance fluctuations in the wire by using a small bias current and a high thermal coefficient of resistance material. The bolometer 202 can be placed in the light path or adjacent to optics to harvest scattered light.

The output of a laser diode used in a HAMR drive is temperature sensitive and susceptible to self-heating. During write operation, for example, laser diode heating can vary the junction temperature of the laser diode, causing a shift in laser emission wavelength, leading to a change of optical feedback from optical path in slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping and magnetic transition shifting from one block of data to another. Large transition shifts in a block of data may not be recoverable by channel decoding, resulting in error bits.

Figure 3:
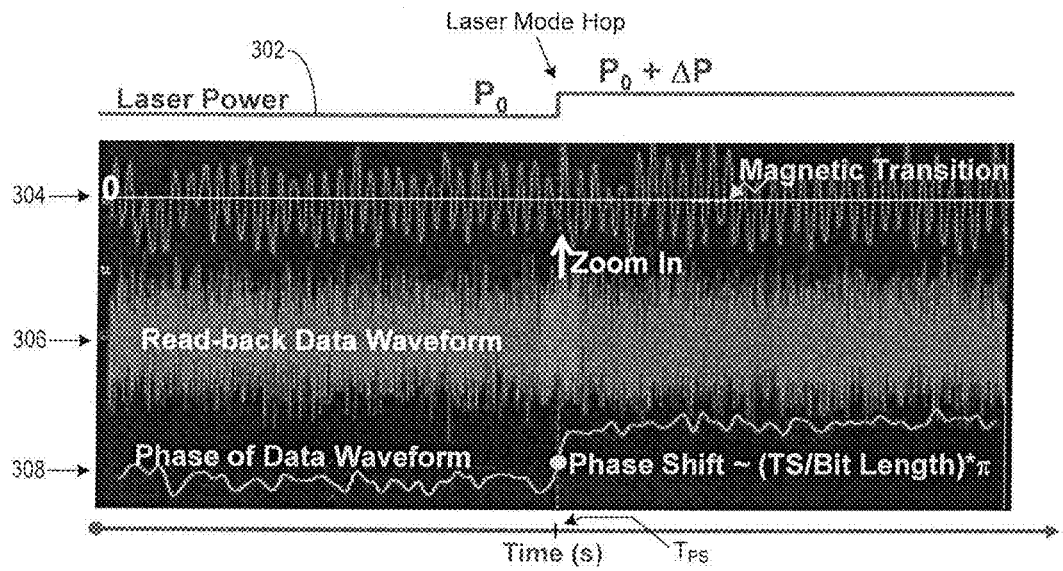
FIG. 3 illustrates several waveforms associated with a laser mode hop that can occur in a HAMR drive.

FIG. 3 illustrates several waveforms associated with a laser mode hop that can occur in a HAMR drive. At the top of FIG. 3, a laser power curve 302 is illustrated. The laser power curve 302 is relatively constant at a first power level, $P_0$ during an initial portion of a write operation. At a time $T_{PS}$, an abrupt change in laser power is experienced, resulting in a change of laser power from the first power level, $P_0$, to a second power level, $P_0+\Delta P$. The abrupt step-change in the laser power curve 302 is indicative of a laser mode hop occurring at time $T_{PS}$. This jump in laser power results in a shift in the location/timing of written transitions, and a corresponding change in the phase of the magnetic waveform.

Three waveforms are shown below the laser power curve 302, including a read back waveform 306, a read back waveform 304 which is a zoomed-in (e.g., magnified) view of the read back waveform 306, and a phase waveform 308. A horizontal axis is shown passing through the read back waveform 304 at zero-crossing locations to denote where the moment of the magnetic recording media transitions between states (e.g., positive and negative states). The locations of several magnetic transitions are shown for the read back waveform 304 which correspond to zero-crossing locations. The location of the laser mode hop is indicated by the arrow pointing toward the read back waveform 304.

The read back waveform 304 or 306 shown in FIG. 3 is a signal that results from reading magnetic transitions on a magnetic recording medium. The phase waveform 308 represents the phase of the read back data waveform 304 or 306 and is processed to detect a phase shift indicative of the laser mode hop. As can clearly be seen in the phase waveform 308, a significant phase shift in the read back data waveform 304 or 306 occurs at the time, $T_{PS}$, (the time of the laser mode hop). This phase shift corresponds to a physical shift (e.g., in nanometers) in one or more the magnetic transitions due to the laser power variation (jump) caused by the mode hop. The phase shift caused by a laser mode hop can be approximated by the equation $(TS/wavelength)*2\pi$, where TS is the transition shift in nanometers and wavelength is the period of the waveform (in nanometers). The wavelength can have a length of about 10 nm, for example.

Figure 4:
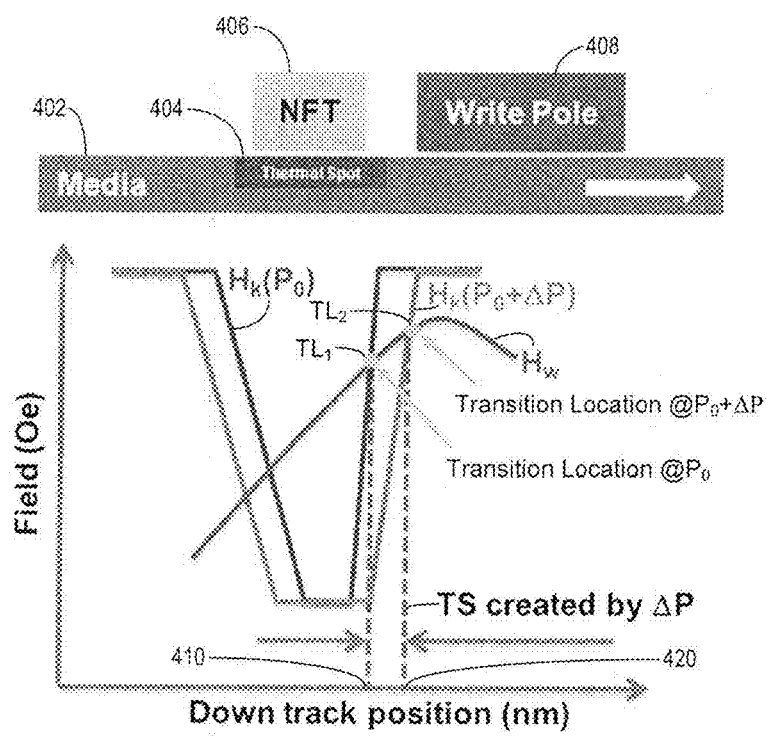
FIG. 4 shows various details of a transition shift created by an abrupt change in laser power due to a laser mode hop.

FIG. 4 shows various details of a transition shift created by an abrupt change in laser power due to a laser mode hop. FIG. 4 shows an NFT 406 and a write pole 408 of a HAMR head in proximity to a magnetic recording medium 402, with a thermal spot 404 created on the medium 402 by the NFT 406 during a write operation. FIG. 4 also shows the change in media coercivity ($H_k$ in Oe) when writing to the medium 402 at a first laser power level, $P_0$ (desired laser power level) and at a second laser power level ($P_0+\Delta P$) (change in laser power level due to due to a mode hop). A write field curve, $H_W$, is superimposed over the media coercivity curves, and includes two transition locations, $TL_1$ $TL_2$. The curve $H_k(P_0)$ shows the change in media coercivity due to NFT heating at the first (desired) laser power level, $P_0$, with the correct transition location, $TL_1$, shown at a first down track position 410. The curve $H_k(P_0+\Delta P)$ shows the change in media coercivity due to NFT heating at the second laser power level, $P_0+\Delta P$, due to a mode hop, with a shifted transition location, $TL_2$, shown at a second down track position 420. The difference between the shifted transition location, $TL_2$, and the desired transition location, $TL_1$, represents the magnitude of the transition shift due to the mode hop.

An important factor in accounting or correcting for laser mode hopping is understanding the magnitude of the resulting magnetic transition shift. Although the adverse impact of laser mode hopping can been observed, a quantitative measurement of one or more metrics of the resulting transition shift has heretofore been unavailable. Embodiments of the present disclosure are directed to methods and apparatuses for measuring a metric of one or more transition shifts that result from laser power variations due to mode hopping.

Figure 5:
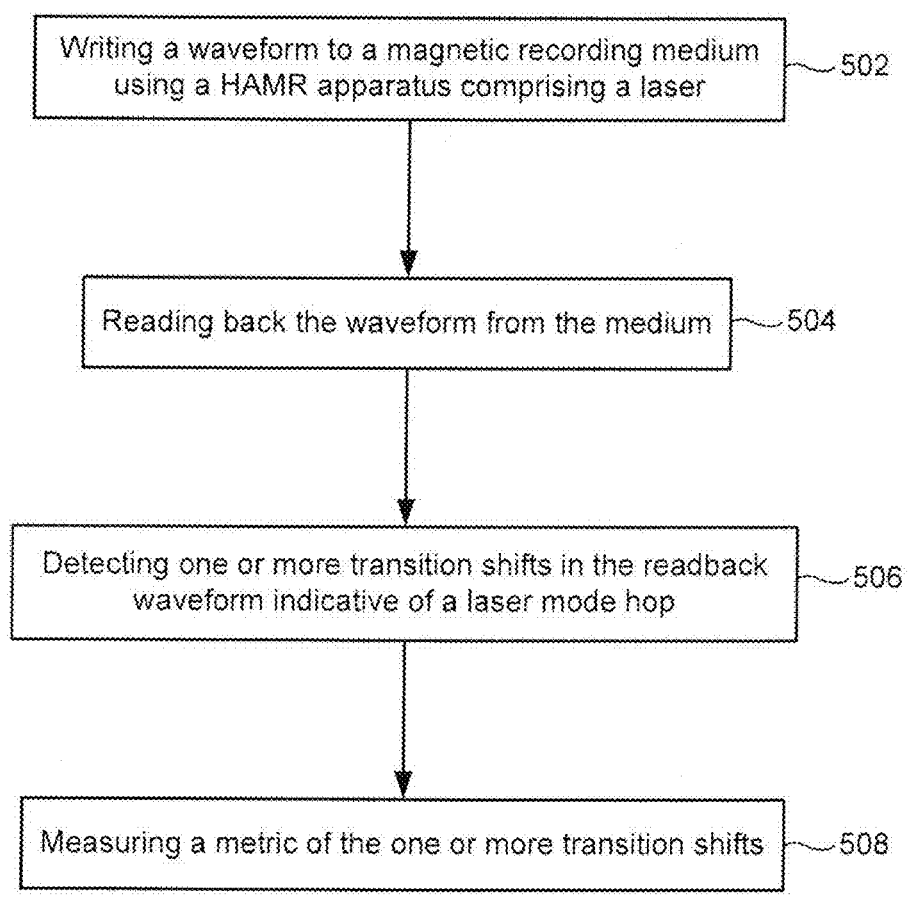
FIG. 5 illustrates a method for quantifying transition shifts due to laser mode hopping in accordance with various embodiments.

FIG. 5 illustrates a method for quantifying transition shifts due to laser mode hopping in accordance with various embodiments. The method shown in FIG. 5 involves writing 502 a waveform to a magnetic recording medium using a HAMR apparatus comprising the laser. The method involves reading back 504 the waveform from the medium, and detecting 506 one or more transition shifts in the read back waveform indicative of a laser mode hop. The method also involves measuring 508 a metric of one or more of the transition shifts.

Figure 6:
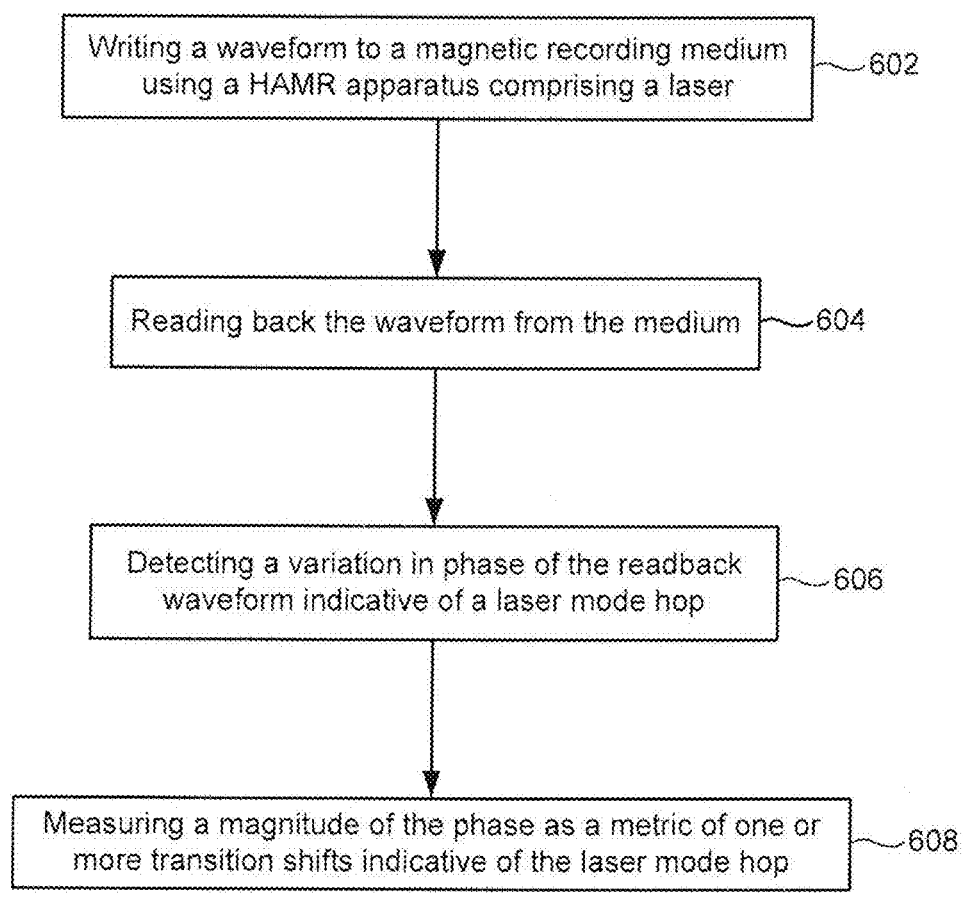
FIG. 6 illustrates a method for quantifying transition shifts due to laser mode hopping in accordance with other embodiments.

FIG. 6 illustrates a method for quantifying transition shifts due to laser mode hopping in accordance with other embodiments. The method shown in FIG. 6 involves writing 602 a waveform to a magnetic recording medium using a HAMR apparatus comprising a laser. The method involves reading back 604 the waveform from the medium, and detecting 606 a variation in phase of the read back waveform indicative of a laser mode hop. The method also involves measuring 608 a magnitude of the phase as a metric of one or more transition shifts indicative of the laser mode hop.

Figure 7:
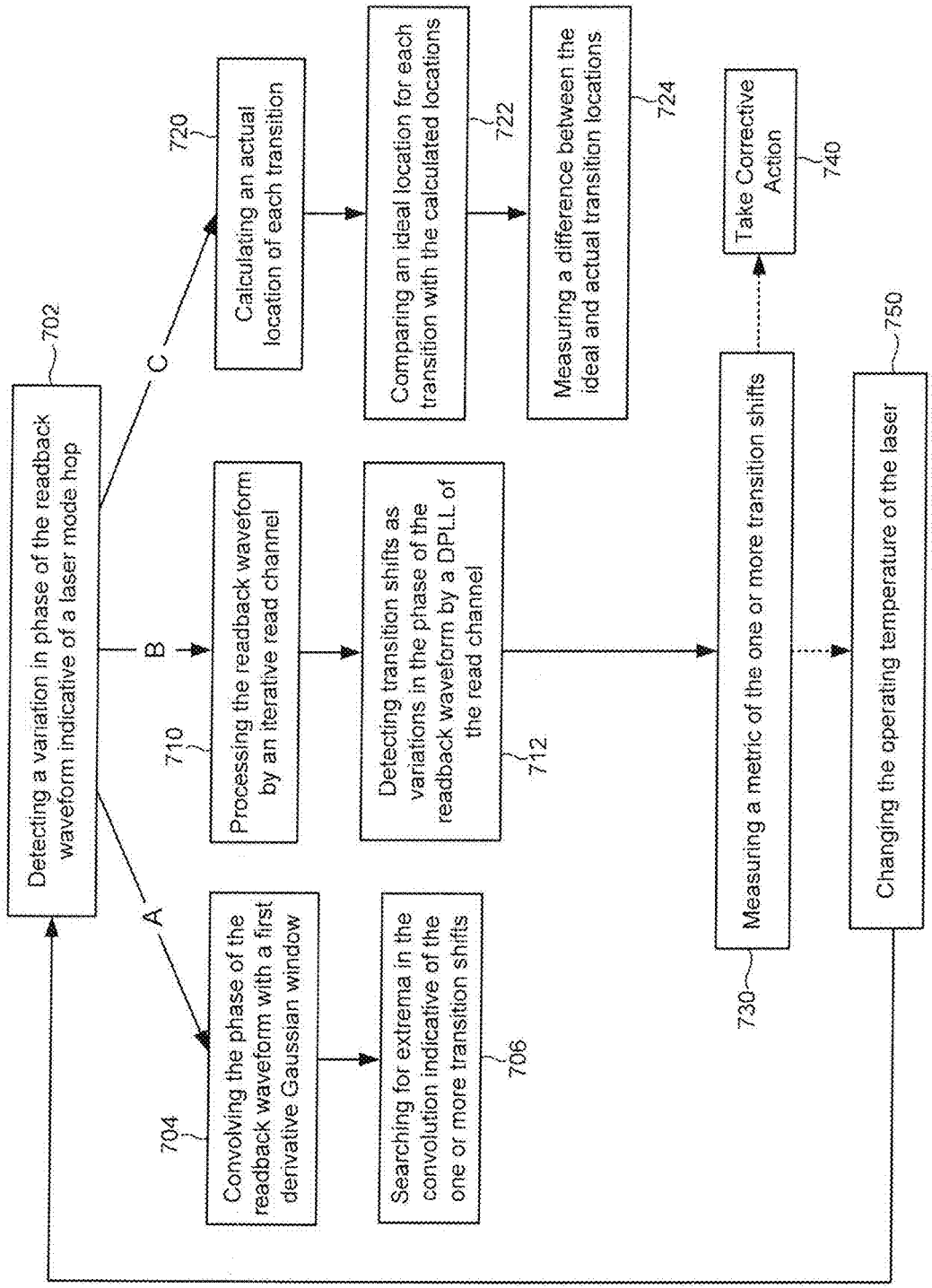
FIG. 7 illustrates different methods for detecting a variation in phase of a read back waveform indicative of a laser mode hop in accordance with various embodiments.

FIG. 7 illustrates different methods for detecting 702 a variation in phase of a read back waveform indicative of a laser mode hop in accordance with various embodiments. More particularly, FIG. 7 shows three different detection methodologies (A, B, and C). A first detection methodology (A) involves convolving 704 the phase of the read back waveform with a first derivative Gaussian window, and searching 706 for extrema in the convolution indicative of the one or more transition shifts. A second detection methodology (B) involves processing 710 the read back waveform by an iterative read channel, and detecting 712 transition shifts as variations of the phase of the read back waveform by a DPLL (digital phase-lock-loop) of the read channel. A third detection methodology (C) involves calculating 720 an actual location of each transition, and comparing an ideal location for each transition with the calculated locations. The third methodology also involves measuring 724 a difference between the ideal and actual transition locations.

Having detected one or more transition shifts according to method A, B or C, the method further involves measuring 730 a metric of the one or more transition shifts. Various metrics of the transition shifts can be calculated, including a count of transition shifts that occurred during recording of one track of data, a mean (and/or median) of the transition shifts in nanometers, and a maximum of the transition shifts in nanometers. A metric of quality (e.g., 1: good; 0: bad) of the transition shift data can also be determined based on noise in the data. In some embodiments, corrective action 740 can be taken in response to the transition shift measurements. The type of corrective action can be dependent on the magnitude of the transition shift measurement. For example, a write protect procedure can be implemented. As another example, short writes rather than long writes can be instigated. In another example, a read-after-write protocol can be implemented. In a further example, the host can be notified to refrain from long writes.

As is further shown in FIG. 7, the method may involve changing 750 a temperature of the laser. Laser mode hops occur at multiple critical temperatures of the laser diode junction. Between these critical temperatures are temperature zones within which the likelihood of a laser mode hop is relatively low. As the temperature of the laser diode junction changes during a write operation, there is a risk that a critical temperature boundary may be crossed, resulting in a mode hop. Changing the operating temperature of the laser 750 can serve to move the laser diode junction temperature into a zone of relatively low mode hopping risk. Alternatively changing the operating temperature of the laser 750 can serve to purposefully provoke a laser mode hop in order to determine and map the critical temperatures for the laser diode. The processes 702-730 shown in FIG. 7 can be implemented after changing 750 the operating temperature of the laser to detect laser mode hopping and to quantify transition shifts resulting therefrom.

One approach to changing 750 the operating temperature of the laser involves changing the laser bias current ($i_{bias}$) while keeping the total laser current ($I_{total}$) the same. The total laser current ($I_{total}$) refers to the total laser current applied to the laser diode. The laser bias current, $i_{bias}$, refers to the laser current that is applied to the laser diode in a HAMR head in write mode, but not doing writing. Laser bias current, $i_{bias}$, differs from the total laser current applied to the laser diode during writing, which is referred to as the laser operating current ($I_{op}$) (noting that $I_{op}=I_{total}-I_b$). The laser bias current ($i_{bias}$) can be incrementally increased (or decreased) to change the operating temperature of the laser diode (e.g., in steps of +/−0.2 mA). While the laser bias current ($I_{bias}$) is being adjusted, the laser operating current ($I_{op}$) can also be adjusted in order to keep the total laser current ($I_{total}$) constant.

The measurements described in FIG. 7 can be repeated at different laser bias current settings while the total laser current is the same. Measuring at different laser bias current levels extends the temperature of the laser diode by ~10° C., and increases the probability of creating and catching laser power variations. It has been found that HAMR recording heads that show good laser power stability across multiple bias laser current levels are more likely to have stable laser power while operating in a drive. Other approaches to changing 750 the operating temperature of the laser involve writing a different number of revolutions, changing the duty cycle, or changing the ambient temperature of the HAMR drive or spin stand tester (which may be difficult).

Figure 8A:
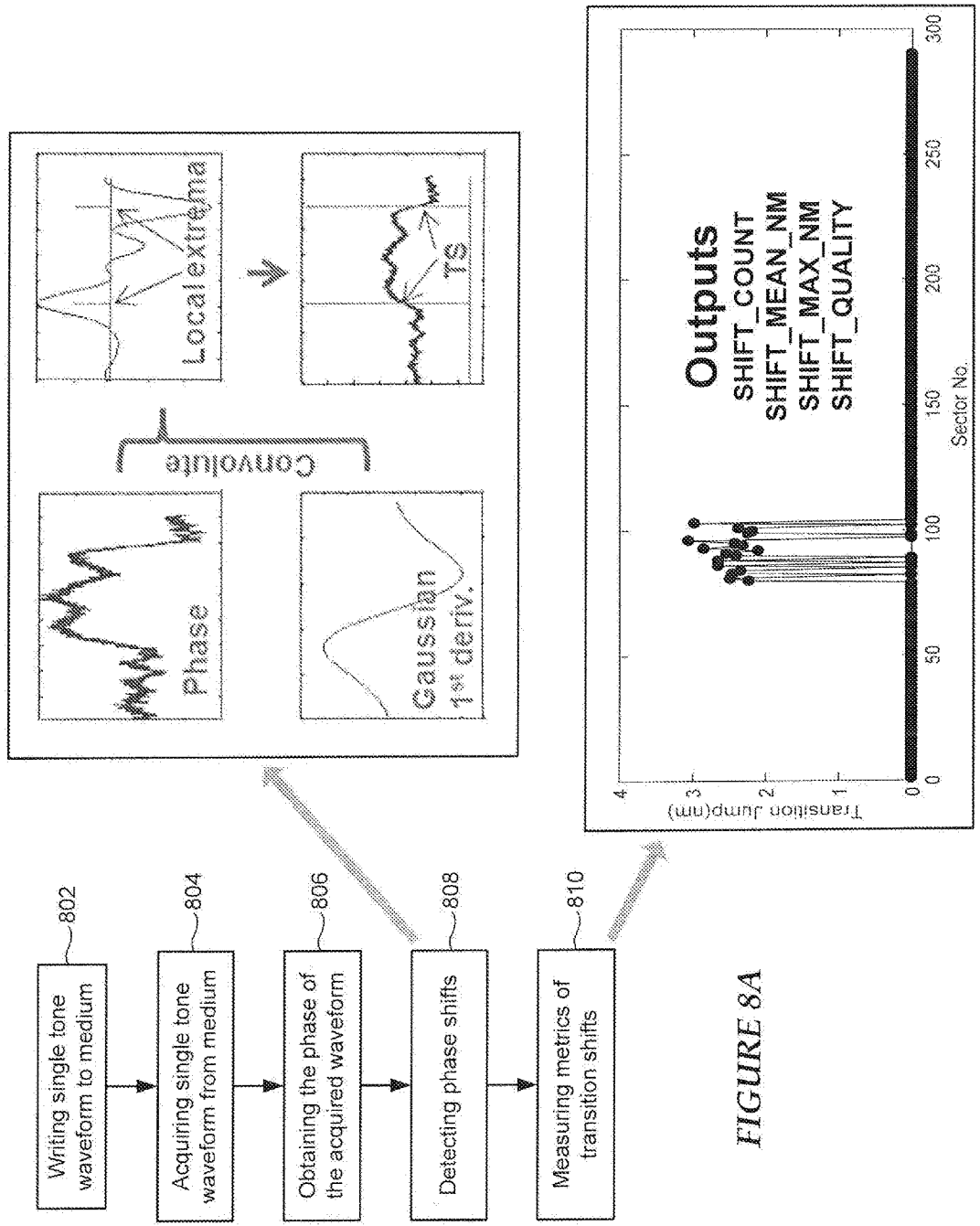
FIG. 8A shows various details of the first detection methodology (A) shown in FIG. 7 in accordance with various embodiments.

FIG. 8A shows various details of the first detection methodology (A) shown in FIG. 7 in accordance with various embodiments. The method shown in FIG. 8A involves writing 802 a single tone waveform to the medium. The single tone waveform can have a frequency of 100 MHz, 150 MHz, 200 MHz or 250 MHz, for example. The method involves acquiring 804 the single tone waveform from the medium, obtaining 806 the phase of the acquired waveform, and detecting 808 phase shifts in the waveform. As a shown in FIG. 8A, the phase of the acquired waveform is convolved with a first derivative Gaussian window. The number of samples in the Gaussian window should be compatible with the number of samples in the transition shift window where the phase jump occurs. This serves to avoid over-detection due to the phase variations unrelated to laser mode hopping.

A search of the convolution is performed to detect local extrema. The local extrema are indicative of phase jumps due to laser power variations resulting from mode hops. The local extrema are locations where magnetic transition shifts occur. The magnitude of the phase/transition shift is calculated as the difference between the mean of the phase before and after the local extrema locations. After detecting 808 the phase shifts, the method further involves measuring 810 one or more metrics of the transition shifts. For example, and as shown in FIG. 8A, the measured metrics of the transition shifts can include the number (count) of transition shifts, the mean of the transition shifts (in nanometers), the maximum of the transition shifts (in nanometers), and a metric of quality of the transition shift data (e.g., relative noise of the data). In the representative example shown in FIG. 8A, the measured metrics of the detected transition shifts include a count of 17 transition shifts, a mean transition shift of 2.5 nm, and a maximum transition shift of 3.1 nm.

The following is an example of measuring metrics of transition shifts in accordance with various embodiments. Assume that one data track is defined over one revolution of the magnetic recording medium. If, for example, the medium is rotating at 6,000 revolutions per minute (RPM), then one revolution of data is acquired in 10 ms. This 10 ms of data is divided into multiple data sectors (e.g., 290 sectors). Between two adjacent data sectors is a servo sector which is used to help keep writing/reading elements on track. The phase plot shown in FIG. 8A is the phase for one data sector. This particular sector has 2 transition shifts. When processing the data, all 290 sectors of data are analyzed. Some sectors have 0 transition shifts, while some sectors have 1 transition shift. The bottom right plot in FIG. 8A shows the magnitude of the transition shifts for all 290 sectors. From this data, statistics of all transition shifts (e.g., count, maximum, and mean) can be calculated. In addition, phase shift is equivalent to transition shift. The conversion is given by: transition shift=phase shift/($2\pi$)*wavelength. The unit of phase shift is radians, and the unit of transition shift/wavelength is nm.

Figure 8B:
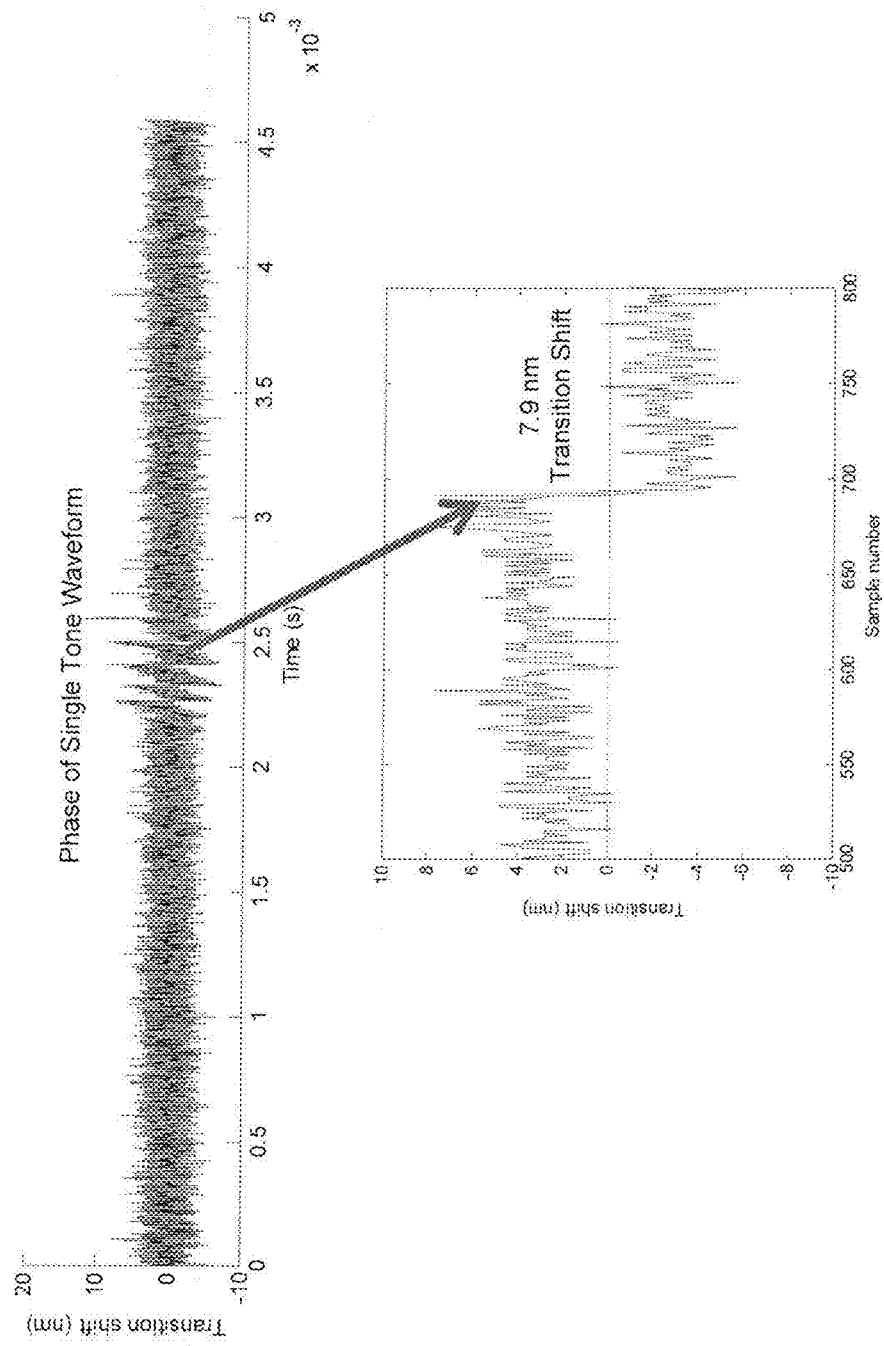
FIG. 8B shows the phase of a representative single tone waveform (upper image) and a detailed view (lower image) of a phase shift due to a laser power variation resulting from a laser mode hop.

FIG. 8B shows the phase of a representative single tone waveform (upper image) and a detailed view (lower image) of a phase shift due to a laser power variations resulting from a laser mode hop. In the representative example shown in FIG. 8B, the phase shift of the single tone waveform resulting from the mode hop produced a 7.9 nm transition shift.

According to some embodiments, the single total waveform is acquired 804 from the medium using equipment external to the HAMR drive. The external equipment can be, for example, a tester or an analyzer. Obtaining 806 the phase of the acquired waveform can involve phase demodulation performed by analysis software implemented by the analyzer. Detecting 808 the phase as shown in FIG. 8A can be performed by software implemented by the analyzer. Measuring 810 various metrics of the transition shifts can be performed by software implemented by the analyzer. By way of example, the analyzer can be configured to implement a Canny edge detector algorithm.

Figure 9A:
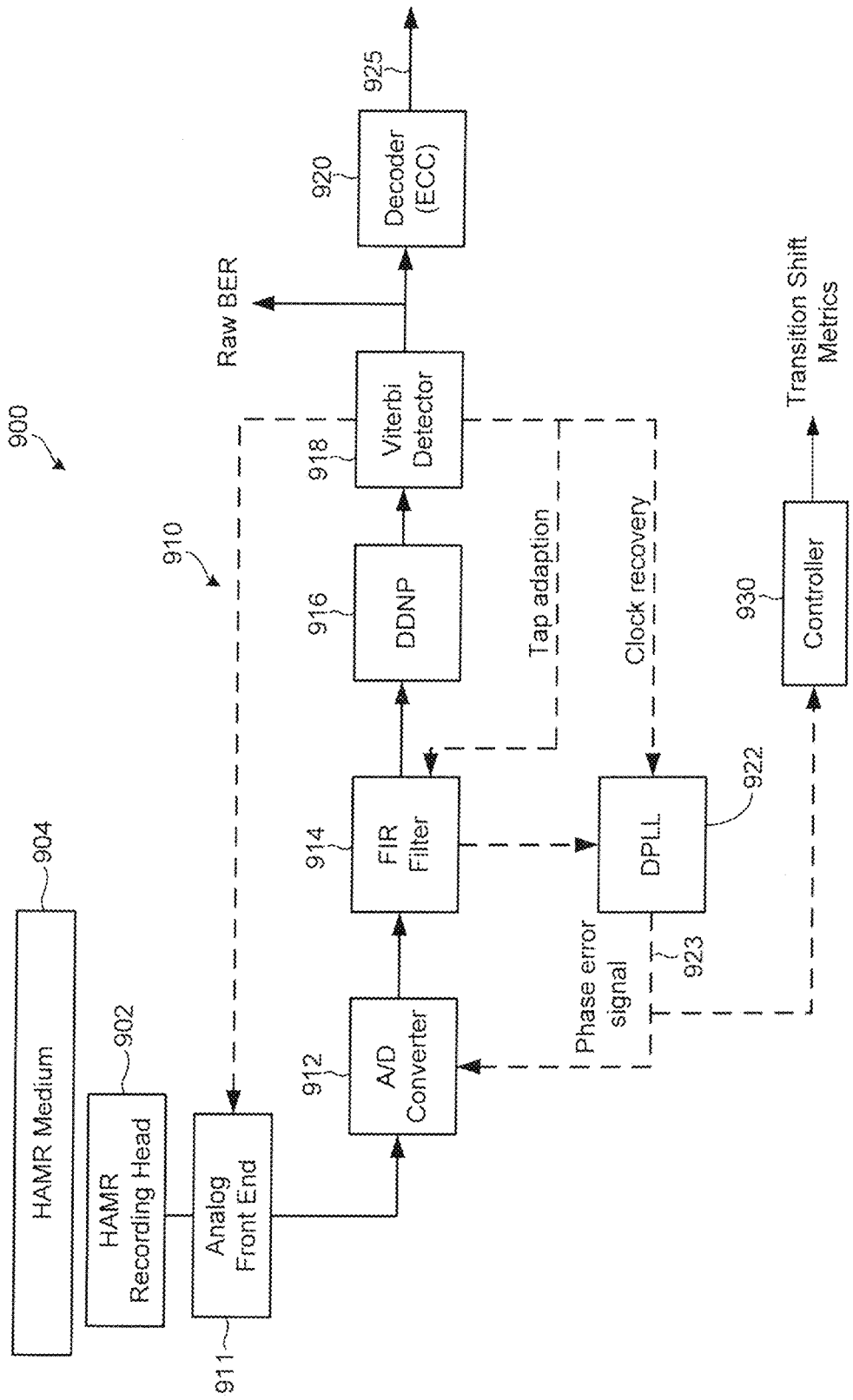
FIGS. 9A and 9B show various details of the second detection methodology (B) shown in FIG. 7 in accordance with various embodiments.
Figure 9B:
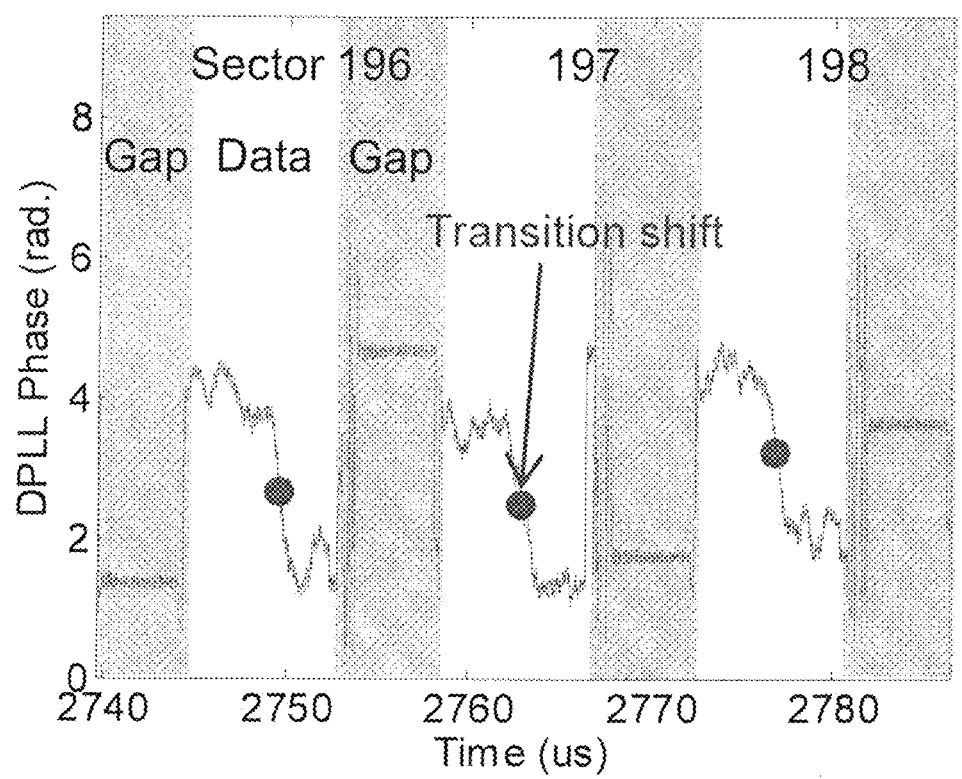

FIGS. 9A and 9B show various details of the second detection methodology (B) shown in FIG. 7 in accordance with various embodiments. The second detection methodology (B) shown in FIG. 7 and further in FIGS. 9A and 9B can be implemented in-situ a HAMR drive, without the need for external equipment. FIG. 9A shows the various components of an iterative read channel 900 of a HAMR drive. The HAMR drive includes a magnetic recording medium 904 positioned in proximity to a HAMR recording head 902. The recording head 902 is coupled to an analog front end 911 (e.g., variable gain amplifier, a low pass filter) of the read channel 900. The analog front end 911 receives an analog waveform (read back data waveform) from the head 902. The read channel 900 includes an analog-to-digital (A/D) converter 912 coupled to the analog front end 911 and to a FIR (finite impulse response) filter 914. The FIR filter 914 is coupled to a DDNP (data-dependent noise-prediction) module 916 which, in turn, is coupled to a Viterbi detector 918. The output of the Viterbi detector 918 is coupled to an iterative decoder 920 which is configured to perform error correction (ECC) to provide corrected user bit data at an output 925.

A digital phase-lock-loop (DPLL) module 922 receives inputs from the FIR filter 914 and the Viterbi detector 918. The DPLL module 922 includes a phase detector that receives an error signal ($y_{ACTUAL}$ from the FIR filter 914–$y_{IDEAL}$ from the Viterbi detector 918) and produces a phase error signal at an output 923 that corresponds to the phase difference between the analog waveform input to the analog front end 911 and a clock signal for the A/D converter 912. A phase signal is produced at the output 923 of the DPLL 922 and is indicative of an estimated phase disturbance. This phase signal is input to a controller 930 configured to convert the phase disturbance (phase change) present in the phase signal to a transition shift measurement in accordance with embodiments of the disclosure. For example, the controller 930 can be configured to implement one of the transition shift measurement techniques discussed herein.

FIG. 9B shows a representative phase signal output from the DPLL 922 as a function of time. The DPLL phase signal shown in FIG. 9B indicates the occurrence of laser power variations due to mode hopping in three consecutive sectors (sectors 196, 197, and 198). In general, a laser mode hop will produce a phase disturbance in the read back data waveform over a number of sectors. The controller 130 coupled to the DPLL 922 compares variations of the phase signal to a threshold to detect the presence of a phase jump due to a laser mode hop. It is understood that some noise in the phase signal occurs due to a number of factors not involving laser power variations due to mode hopping. This "normal" noise in the phase signal determines a noise floor. As can clearly be seen in FIG. 9B, a laser power variation due to a mode hop results in a significant jump in the phase signal that can clearly be distinguished from the noise floor. A threshold can be established to detect the jump in the phase signal due to a mode hop relative to the noise floor. For example, a representative threshold is that the phase shift has to be larger than three times the standard deviation of the phase waveform.

The phase jumps can be converted by the controller 132 to transition shifts in units of nanometers. For example, the phase jump (in radians) can be converted into nanometers by the controller 132 implementing the following equation: transition shift=phase jump/($2*\pi$)*bit length. It is noted that bit length (rather than wavelength) is used here because the waveform is analyzed using the read/write channel which operates on bit length (rather than wavelength). Bit length= (1/clock rate)*linear velocity of the disk. For example, if the clock rate is 1 G bit per second, and the linear velocity of the disk is 25 nm/ns, the bit length would be 1 ns*25 nm/ns=25 nm. Various metrics can be generated (e.g., mean, max, count) by the controller 132.

Figure 10:
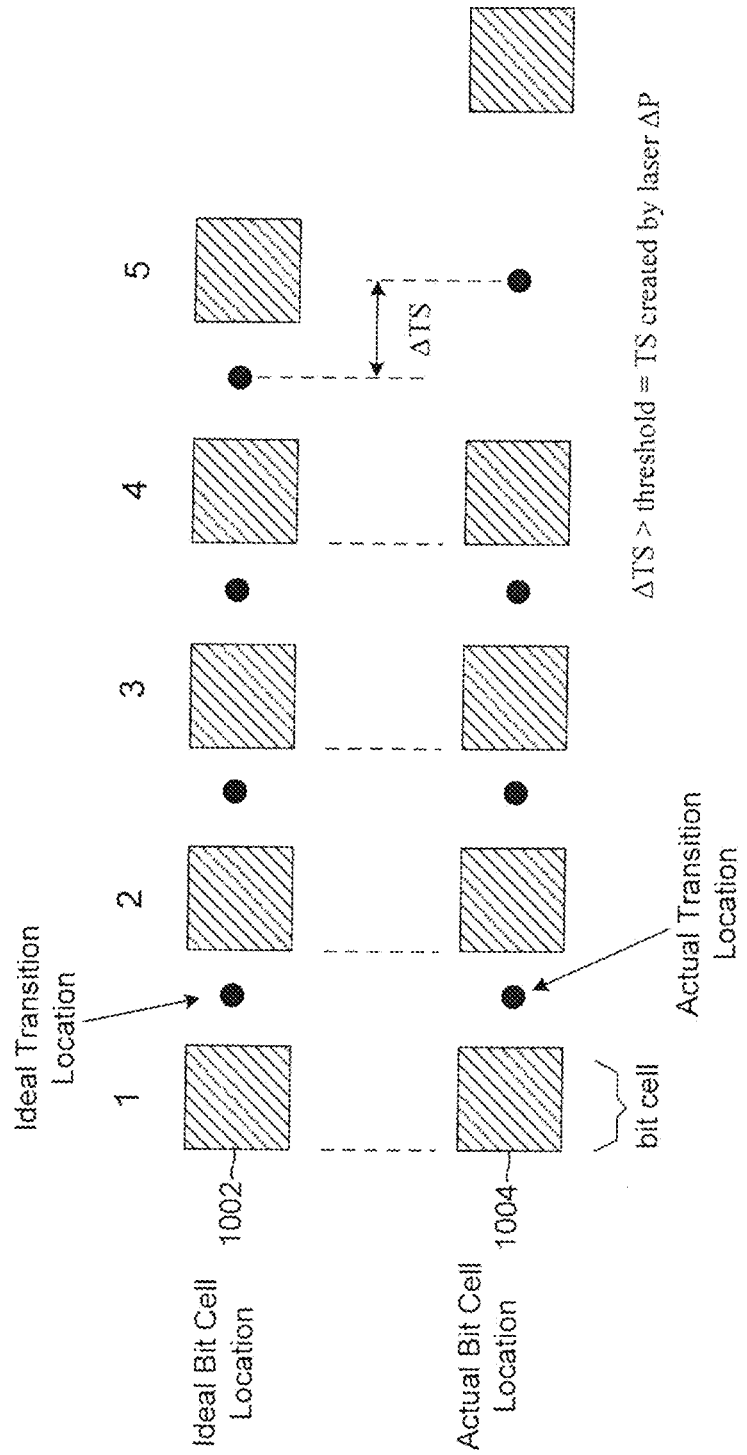
FIG. 10 shows various details of the third detection methodology shown in FIG. 7 in accordance with various embodiments.

FIG. 10 shows various details of the third detection methodology shown in FIG. 7 in accordance with various embodiments. FIG. 10 shows a series of bit cells 1002 positioned at ideal locations as would be known when writing a waveform to a magnetic storage medium. FIG. 10 also shows a series of bit cells 1004 positioned at actual locations as would be known when reading the waveform from the medium. Ideal transition locations are denoted by dots between adjacent ideal bit cell locations 1002. Actual transition locations are denoted by dots between adjacent actual bit cell locations 1004. It can be seen in FIG. 10 that, for the first four bit cells (1-4), the ideal and actual transition locations (first 3 dots) are substantially the same, indicating the absence of a laser mode hop. For example, the first three ideal transition locations (first 3 dots) can be at 0 nm, 20 nm, and 40 nm locations for a bit cell length of 20 nm. The first three actual transition locations (first 3 dots) are also at 0 nm, 20 nm, and 40 nm locations.

For the fifth (5) bit cells 1002 and 1004, the ideal and actual transition locations ($4^{th}$ dots) differ substantially, indicating the presence of a laser mode hop. For example, the fourth ideal transition between fourth and fifth bit cells 1002 and 1004 would be located at 60 nm in this illustrative example. The fourth actual transition between fourth and fifth bit cells 1002 and 1004, however, is located at 70 nm due to a mode hop. By calculating the difference between the actual transition location and the ideal transition location, it can be determined that the actual transition location between the fourth and fifth bit cells 1002 and 1004 shifted by 10 nm.

A measurement is made (e.g., by a controller) to determine when the ideal and actual transition locations differ and by how much. If the ideal and actual transition locations differ ($\Delta TS$) by a predetermined threshold, then this difference is attributed to a laser power variation due to a laser mode hop. The predetermined threshold can be a percentage of bit cell length, such as between 10% and 30% of the bit cell length (e.g., >15%). For example, if the actual location of the bit cell at position 5 differs from the ideal transition location at position 5 by greater than 15% of the bit cell length (e.g., $\Delta TS > 15\%$ BCL), a laser mode hop is declared.

Figure 11:
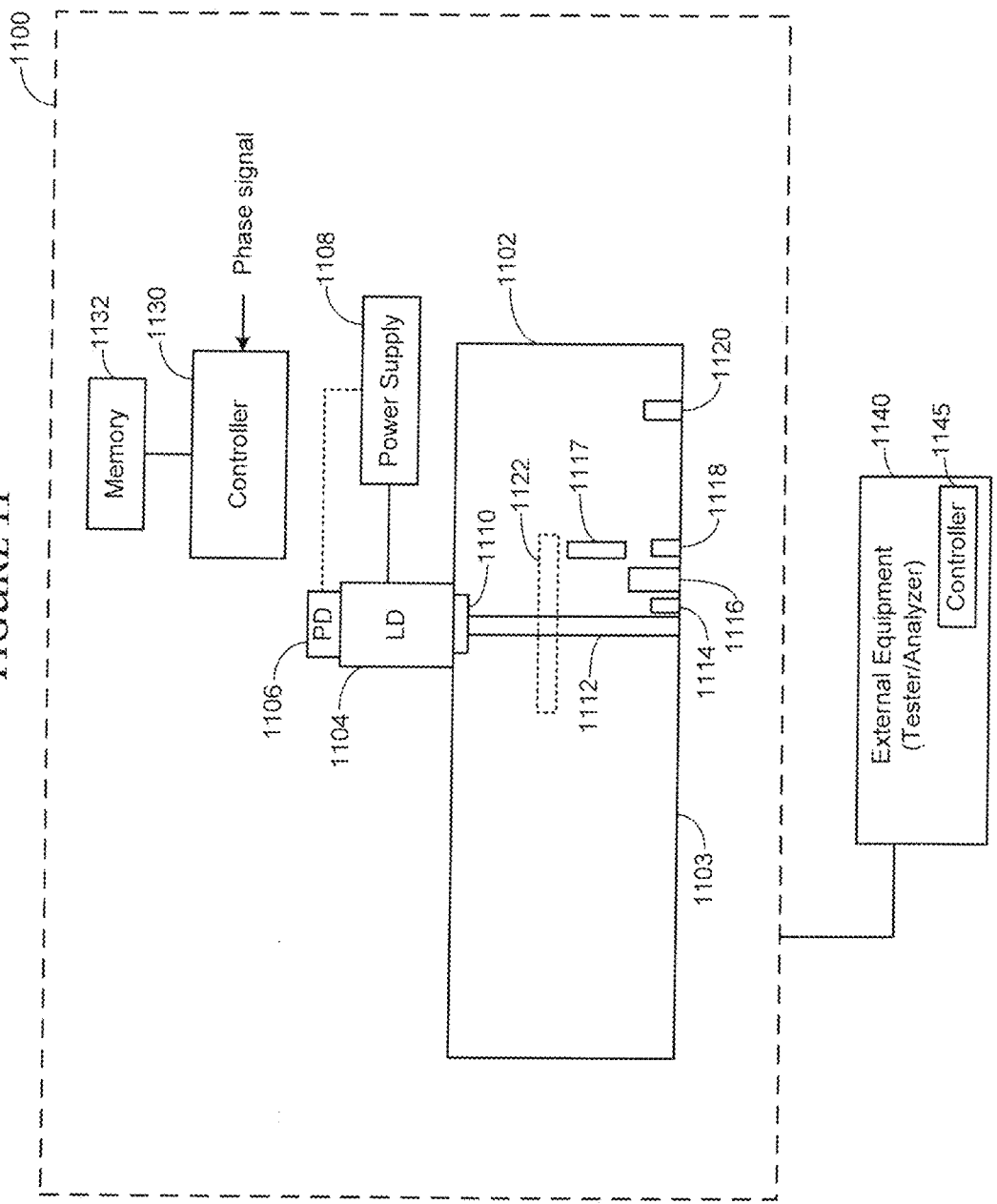
FIG. 11 is a block diagram of a system for measuring transition shifts due to laser power variation in accordance with various embodiments.

FIG. 11 is a block diagram of a system for measuring transition shifts due to laser power variation in accordance with various embodiments. FIG. 11 shows a portion of a HAMR drive 1100 which includes a slider 1102 upon which a laser diode 1104 is mounted. A photodetector 1106 is mounted on or in close proximity to the laser diode 1104. A power supply 1108 is coupled to the laser diode 1104 and provides a supply current to the laser diode 1104. An output of the photodetector 1106 is coupled to the power supply 1108. The power supply 1108 can adjust the current supplied to the laser diode 1104 in response to the photodetector output.

The slider 1102 includes a number of components including an optical waveguide 1112 which is optically coupled to the laser diode 1104 via an optical coupler 1110. The optical waveguide 1112 extends from the optical coupler 1110 to the NFT 1114 situated at the air bearing surface 1103 proximate the optical waveguide 1112. In some embodiments, a bolometer 1122 is situated proximate the optical waveguide 1112.

A writer 1116 is situated proximate the NFT 1114. A heater 1117 is situated proximate the writer 1116 and configured to thermally actuate the writer 1116. A contact sensor 1118 is situated proximate the writer 1116 and NFT 1114 (e.g., at a close point of the writer). A reader 1120 is shown positioned away from the writer 1116 and contact sensor 1118.

The HAMR drive 1100 further includes a controller 1130 (e.g., processor) coupled to a memory 1132. The controller 1130 is configured to measure transition shifts due to laser power variation in accordance with various embodiments described hereinabove. The controller 1130 receives a number of inputs from the various components of the slider 1102/drive 1100. For example, the controller 1130 receives a phase signal from the iterative read channel of the drive 1100, detects jumps in the phase signal, and converts the phase jumps to transition shifts in units of nanometers. The controller 1130 can generate other metrics of the transition shifts (e.g., count, max, mean).

In some embodiments, external equipment 1140 (tester/analyzer) is coupled to the HAMR drive 1100 and used during manufacture or design development, for example. The external equipment 1140 includes a controller 1145 (or processor) which cooperates with the controller 1130 of the HAMR drive 1100. The controller 1145 of the tester/analyzer 1140 is configured to measure transition shifts due to laser power variation in accordance with various embodiments. For example, the controller 1145 is configured to convolve the phase of a read back waveform acquired from the HAMR drive 1100 with a first derivative Gaussian window, and search for extrema in the convolution indicative of one or more transition shifts. The controller 1145 can generate various metrics of the measured transition shifts (e.g., count, max, mean). The controller 1145 can be configured to perform various methodologies disclosed hereinabove.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
   writing a waveform on a magnetic recording medium using a heat-assisted magnetic recording (HAMR) apparatus comprising a laser;
   reading back the waveform from the medium;
   detecting one or more transition shifts in the readback waveform indicative of a mode hop of the laser; and
   measuring a metric of the one or more transition shifts.

2. The method of claim 1, wherein measuring comprises measuring the one or more transition shifts in units of nanometers.

3. The method of claim 1, wherein the metric comprises one or more of a mean, a maximum, and a count of the one or more transition shifts.

4. The method of claim 1, wherein:
   detecting comprising detecting a variation in phase of the readback waveform; and
   measuring comprises measuring a magnitude of the phase variation.

5. The method of claim 1, wherein detecting the one or more transitions shifts comprises:
   convolving a phase of the readback waveform with a first derivative of a Gaussian window; and
   searching for extrema in the convolution indicative of the one or more transition shifts.

6. The method of claim 1, wherein:
   the readback waveform is processed by an iterative read channel; and
   the one or more transition shifts are detected as variations in the phase of the readback waveform by a digital phase-locked loop of the read channel.

7. The method of claim 1, wherein detecting comprises:
   calculating an actual location of each transition of the waveform written to the medium;
   comparing an ideal location for each transition with the calculated locations; and
   measuring a difference between the ideal and actual transition locations.

8. The method of claim 1, further comprising implementing the method at two or more operating temperatures of the laser to evaluate a propensity of a laser mode hop at the two or more operating temperatures.

9. The method of claim 8, wherein the two or more operating temperatures of the laser are achieved by changing a laser bias current applied to a laser diode of the laser.

10. The method of claim 1, wherein:
    writing and reading is performed in-situ a HAMR drive; and
    detecting and measuring is performed using equipment external to the HAMR drive.

11. The method of claim 1, wherein the method is performed in-situ a HAMR drive.

12. An apparatus, comprising:
    a recording head configured for heat-assisted magnetic recording (HAMR) and comprising a laser;
    a controller arrangement coupled to the recording head and configured to:
      write a waveform on a magnetic recording medium using the recording head;
      read back the waveform from the medium using the recording head;
      detect one or more transition shifts in the readback waveform indicative of a mode hop of the laser; and
      measure a metric of the one or more transition shifts.

13. The apparatus of claim 12, wherein the apparatus is disposed in a HAMR drive and the controller arrangement comprises a controller of the HAMR drive and configured to implement the write, read, detect, and measure processes in-situ the HAMR drive.

14. The apparatus of claim 12, wherein the controller arrangement comprises an external controller disposed in a system external to a HAMR drive that includes at least the recording head and the medium, the external controller configured to implement at least the detect and measure processes.

15. The apparatus of claim 12, wherein the metric comprises one or more of a mean, a maximum, and a count of the one or more transition shifts.

16. The apparatus of claim 12, wherein the controller arrangement is configured to measure the one or more transition shifts in units of nanometers.

17. The apparatus of claim 12, wherein the controller arrangement is configured to:
- detect a variation in phase of the readback waveform; and
- measure a magnitude of the phase variation.

18. The apparatus of claim 12, wherein the controller is configured to detect the one or more transitions shifts by:
- convolving a phase of the readback waveform with a first derivative of a Gaussian window; and
- searching for extrema in the convolution indicative of the one or more transition shifts.

19. The apparatus of claim 12, wherein:
- the apparatus comprises an iterative read channel comprising a digital phase-locked loop (DPLL);
- the iterative read channel is configured to process the readback waveform; and
- the DPLL is configured to detect the one or more transition shifts as variations in phase of the readback waveform.

20. The apparatus of claim 12, wherein the controller arrangement is configured to:
- calculate an actual location of each transition of the waveform written to the medium;
- compare an ideal location for each transition with the calculated locations; and
- measure a difference between the ideal and actual transition locations.

21. The apparatus of claim 12, wherein the controller arrangement is configured to implement the write, read, detect, and measure processes at two or more operating temperatures of the laser to evaluate a propensity of a laser mode hop at the two or more operating temperatures.

22. The apparatus of claim 21, wherein the controller arrangement is configured to change the laser operating temperature to the two or more operating temperatures by changing a laser bias current applied to a laser diode of the laser.

* * * * *